United States Patent [19]
Helmintoller, Jr. et al.

[11] 3,897,001
[45] July 29, 1975

[54] NOZZLE AND AUXILIARY INLET ARRANGEMENT FOR GAS TURBINE ENGINE

[75] Inventors: Augustus Mason Helmintoller, Jr., Loveland; Robert Gerald Beavers, Mason, both of Ohio

[73] Assignee: General Electric Company, Lynn, Mass.

[22] Filed: June 12, 1974

[21] Appl. No.: 478,702

[52] U.S. Cl. ... 239/265.13; 239/265.19; 239/265.23
[51] Int. Cl............................................. B64d 33/04
[58] Field of Search..... 239/265.11, 265.19–265.31, 239/265.13

[56] References Cited
UNITED STATES PATENTS

| | | | |
|---|---|---|---|
| 2,943,444 | 7/1960 | Baxter | 239/265.17 |
| 2,987,879 | 6/1961 | Brown | 239/265.19 |
| 3,002,341 | 10/1961 | Muzzy et al. | 239/265.17 |
| 3,041,823 | 7/1962 | Bertin et al. | 239/265.23 |
| 3,098,352 | 7/1963 | Taub et al. | 239/265.23 |
| 3,374,631 | 3/1968 | Marks | 239/265.19 |
| 3,598,319 | 8/1971 | Howald et al. | 239/265.19 |
| 3,667,680 | 6/1972 | Weed | 239/265.13 |
| 3,807,639 | 4/1974 | Soligny et al. | 239/265.19 |

Primary Examiner—Lloyd L. King
Attorney, Agent, or Firm—James W. Johnson, Jr.; Derek P. Lawrence

[57] ABSTRACT

A combined nozzle and auxiliary inlet arrangement is provided for a gas turbine engine of the variable pitch fan type wherein the fan nozzle area may be increased during the reverse pitch mode of operation to accommodate an increased reverse airflow through the fan. At the same time that the fan nozzle area is increased the auxiliary inlet to the engine compressor is also opened to insure an adequate inlet airflow to the compressor during reverse pitch. In addition, the combined nozzle and auxiliary inlet arrangement may be used to simultaneously vary the areas of the fan nozzle and core nozzle in order to reduce both noise and fuel consumption during takeoff and cruise.

5 Claims, 3 Drawing Figures

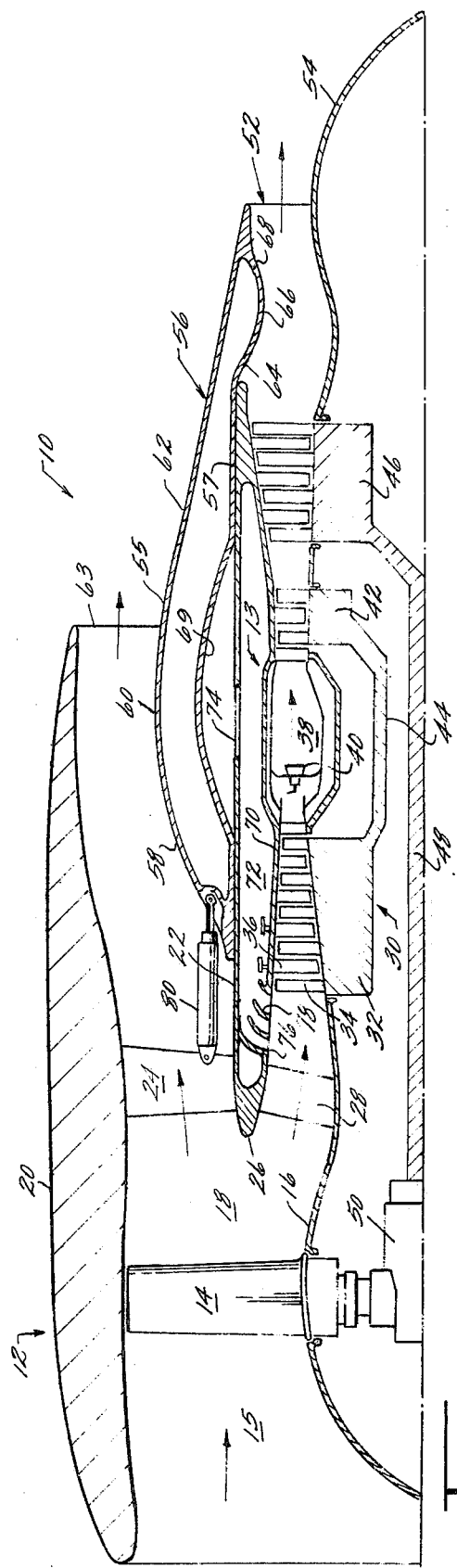
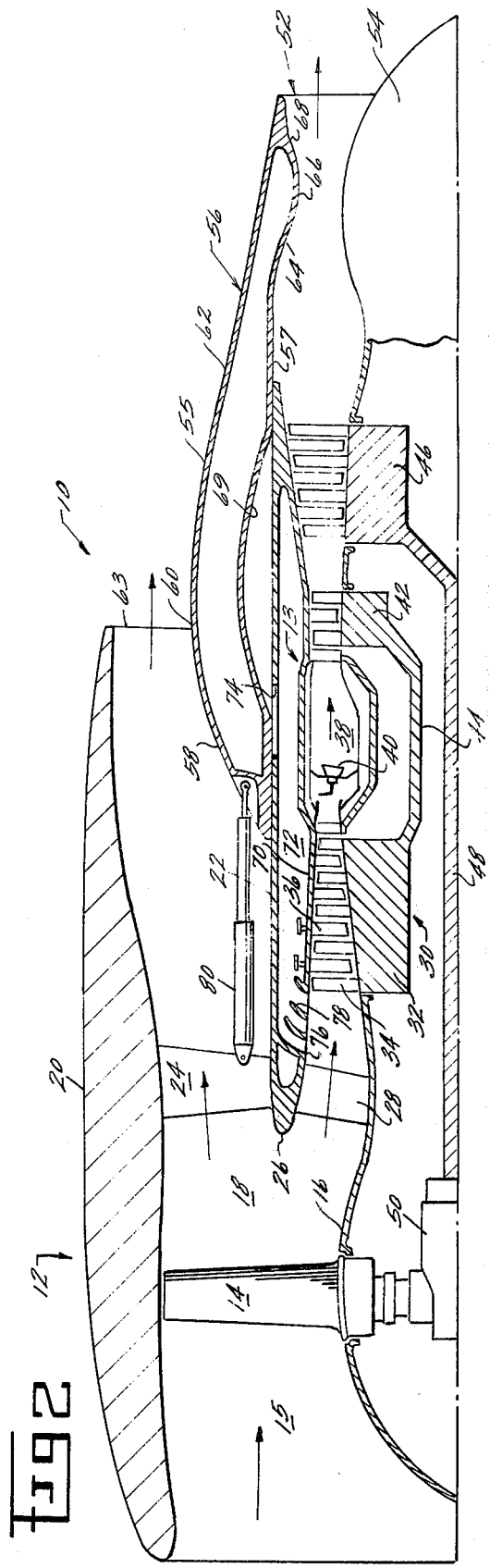

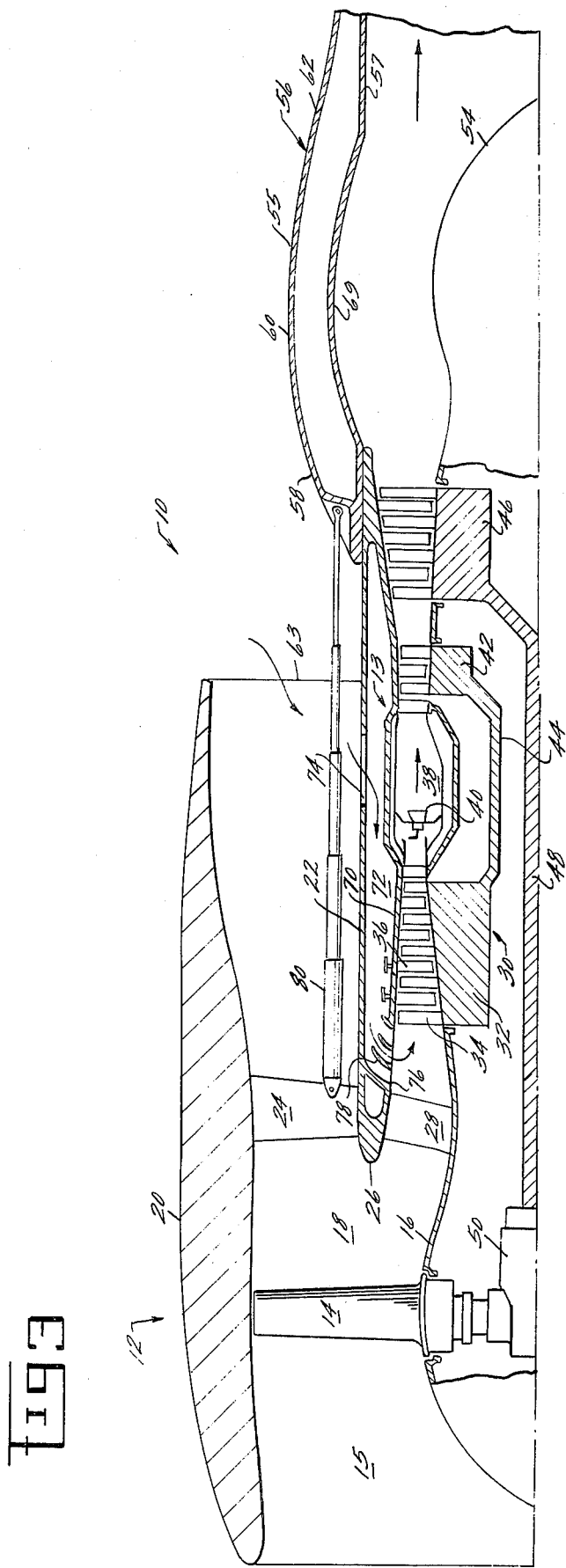

NOZZLE AND AUXILIARY INLET ARRANGEMENT FOR GAS TURBINE ENGINE

BACKGROUND OF THE INVENTION

This invention relates to a nozzle and auxiliary inlet arrangement for a bypass gas turbine engine and, more particularly, to a variable nozzle and auxiliary inlet arrangement for a gas turbine engine of the variable pitch fan type.

Gas turbine engines of the variable pitch fan type have long been discussed in the patent literature. Such engines include an upstream fan where the individual blades of the fan are made rotatable about their longitudinal axes to vary their angle of attack. During engine operation the variable pitch fan blades may be controlled in a known manner to vary the relative magnitude of air mass flow rates through the core engine and bypass in accordance with certain flight parameters, one of which is air speed. It is preferred that the pitch of the fan blades be made infinitely adjustable throughout a range which includes zero or near zero pitch as well as the feathered position where the blade is at 90° to zero pitch. Zero pitch is advantageous when starting certain types of engines to reduce fan load on the engine and the feathered position reduces the otherwise high windmilling drag which would occur in the event of engine failure in flight.

It is also advantageous that the fan blades be made movable from a forward thrust - producing position to a reverse thrust - producing position. In gas turbine engines used to propel aircraft, such a thrust reversing arrangement is particularly advantageous for braking the aircraft after landing. During the reverse thrust mode of operation, the direction of airflow through the bypass fan duct is reversed whereupon the airflow enters from the bypass duct nozzle and exits from the bypass duct inlet. Reversing the direction of airflow through the bypass fan duct poses particular problems in that the bypass duct nozzle area is generally not sufficient to admit the required reverse airflow. Various schemes have been suggested for variable bypass fan duct nozzles wherein the nozzle area may be increased during the reverse thrust mode of operation. Such schemes, however, have generally involved the use of variable nozzle flaps at the downstream end of the bypass duct cowling and therefore result in an unnecessarily thick and heavy bypass cowling which is further complicated by the addition of variable nozzle flaps.

Another problem generally associated with reversing the airflow through a bypass fan duct arises from the fact that a portion of the airflow from the fan duct must be reversed in direction to enter the engine compressor. Various schemes including auxiliary inlets and variable flaps have been suggested to increase the airflow to the compressor during the reverse thrust mode of operation. However, the addition of variable flaps to block off the auxiliary inlet during the forward thrust mode of operation only further adds to the overall engine complexity and weight.

Therefore it is a primary object of this invention to provide a simplified nozzle and auxiliary inlet arrangement for a gas turbine engine of the variable pitch fan type wherein the area of the fan nozzle may be varied without the use of variable flaps.

It is a further object of this invention to provide a simplified nozzle and auxiliary inlet arrangement for a gas turbine engine of the variable pitch type wherein the fan nozzle area may be increased during the reverse thrust mode of operation while at the same time an auxiliary inlet is opened to provide an increased inlet airflow to the engine compressor.

SUMMARY OF THE INVENTION

These and other objects and advantages will become clearly apparent from the following detailed description and drawings, all of which are intended to be representative of, rather than in any way limiting on the scope of invention. A gas turbine engine of the bypass type comprises a core engine with a core exhaust nozzle. A bypass duct is provided around the core engine and includes a bypass exhaust nozzle together with a variable pitch fan disposed within the bypass duct. An auxiliary inlet is provided to the core engine together with means for simultaneously varying the areas of the core and bypass exhaust nozzles while also uncovering the auxiliary inlet to the core engine during the reverse thrust mode of operation.

DESCRIPTION OF THE DRAWINGS

While the specification concludes with claims distinctly claiming and particularly pointing out the invention described herein, it is believed that the invention will be more readily understood by reference to the discussion below and the accompanying drawings in which:

FIG. 1 is a partial cross-sectional view of a gas turbine engine embodying the nozzle and auxiliary inlet arrangement of this invention.

FIG. 2 is a partial cross-sectional view of the gas turbine engine of FIG. 1 in a different mode of operation.

FIG. 3 is a partial cross-sectional view of the gas turbine engine of FIG. 1 in still another mode of operation.

DESCRIPTION OF THE PREFERRED EMBODIMENT

Referring to FIG. 1, there is shown a gas turbine engine 10 of the bypass type which includes a variable pitch fan 12 suitable for attachment to the forward end of the gas turbine engine. The fan 12 includes a plurality of circumferentially spaced apart variable pitch fan blades 14 disposed about an inner fairing 16 which in cooperation with an outer spaced apart cowling 20 defines a static bypass duct 18. The cowling 20 extends forwardly of the blades 14, defining an inlet 15 for the admission of airflow to the fan during the forward thrust producing position of the fan blades 14.

The variable pitch fan 12 is mounted upstream of a core engine or gas generator 13 which is housed within an outer casing 22 open at the forward end to define a primary compressor inlet 26. Downstream from the inlet 26 there is provided a plurality of circumferentially spaced apart inlet guide vanes 28 which direct the inlet airflow to a compressor 30 having a rotatable drum 32 from which extend a plurality of axially spaced apart rows of compressor blades 34. The compressor blades 34 are in turn interspaced between rows of spaced apart stator vanes 36 which may be of the variable type as is well known in the gas turbine art.

Downstream from the compressor 30 there is provided a combustor 38 which receives the compressed airflow from the compressor 30 together with a flow of fuel from a plurality of fuel nozzles 40 whereupon the fuel is ignited and burned in a manner well known to the gas turbine art. The hot gases of combustion then exit from the combustor 38 and impinge upon the blades of a high pressure turbine 42 which in turn drives the compressor 30 through an interconnecting shaft 44. The hot motive fluid thereafter impinges upon the blades of a low pressure turbine 46 which in turn drives the variable pitch fan blades 14 through an interconnecting shaft 48. After exiting from the low pressure turbine 46, the motive fluid is then discharged to atmosphere through a variable exhaust nozzle 52, the operation of which will become apparent from the following discussion.

The individual blades 14 of the fan 12 are made rotatable about their longitudinal axes to vary their angle of attack so that they can be rotated from a forward thrust-producing position to a reverse thrust-producing position. The rotation is achieved by means of a fan pitch control unit 50 which is not described in detail since the details are not relevant to the present invention.

Circumscribing the casing 22 and in sliding engagement therewith, there is provided a translating shroud 56 having an exterior surface 55 which initially diverges at 58 to a throat portion 60 and thereafter converges toward the exhaust nozzle 52. The exterior surface 55 of the shroud 56 cooperates with the inside trailing edge of the fan cowling 20 to define a variable fan nozzle 63. The downstream end of the interior surface 57 of the translating shroud 56 includes a converging portion 64, a throat portion 66, and a diverging portion 68 which cooperates with a bulbous centerplug 54 to define the variable core engine exhaust nozzle 52. The upstream end of the interior surface 57 of the shroud 56 includes a circumferential concave portion shown generally at 69.

The shroud 56 may be translated with respect to the outer casing 22 by a linear actuator 80 interconnecting the shroud 56 with a radially extending strut 24. The linear actuator 80 may be of the well known hydraulic type wherein hydraulic fluid is supplied under pressure to the actuator 80 through a conduit (not shown) from a control source of hydraulic fluid (also not shown). Alternatively, the linear actuator 80 could be of the screw jack type driven by a rotating motion from a hydraulic pneumatic or electric motor (not shown). The control for either hydraulic or screw jack actuators would be similar to that used to control the variable area of a jet exhaust nozzle and thus would be well known to a person of ordinary skill in the art. Also, it is readily apparent that more than one actuator 80 may be disposed about the casing 20 to translate the shroud 56.

An inner casing 70 is provided in spaced apart relation to the outer casing 22 so as to define an annular plenum 72 therebetween wherein the plenum 72 receives an inlet airflow from an opening 74 in the outer casing 22. The opening 74 may be either an annular opening or a plurality of individual inlet ports circumferentially spaced apart about the outer casing 22. The airflow thereafter exits from the plenum 72 through a second opening 76 which may have a cascade of turning vanes 78 disposed therein to reverse the direction of airflow from the plenum into the compressor 30. The opening 74, plenum 72 and opening 76 all cooperate to provide an auxiliary inlet to the compressor 30 during the reverse thrust mode of operation as will become apparent from the following discussion.

Referring now to FIG. 1, there is shown the mode of operation assumed during takeoff when the shroud 56 is translated into its extreme upstream position by the actuator 80. As becomes immediately apparent, the exit areas of the fan exhaust nozzle 63 and the core exhaust 52 are enlarged, thus permitting a maximum mass airflow through the engine with minimum noise.

After takeoff, the shroud 56 may be actuated to translate rearwardly to an intermediate position for the cruise mode of operation as shown in FIG. 2. During the cruise mode of operation, the variable pitch fan blades 14 may be controlled in a known manner to vary the relative magnitude of air mass flow rates through the core engine and bypass in accordance with certain flight parameters, one of which is air speed. It is also preferred that the pitch of the fan blades 14 be infinitely adjustable throughout a range which includes zero or near zero pitch as well as the feathered position where the blade is at 90° to zero pitch. The ability to achieve zero pitch or near zero pitch is advantageous when starting certain types of engines in order to reduce the fan load on the engine and the ability to achieve the feathered position reduces the otherwise high windmilling drag which would occur in the event of engine failure in flight. Also as is readily apparent, the outer area of the fan nozzle 63 and the core engine nozzle 52 are reduced to accommodate the decrease in mass airflow through the engine during cruise, thus improving specific fuel consumption.

Referring now to FIG. 3, there is shown the mode of operation assumed immediately after landing when the pitch of the fan blades 14 is reversed in order to reverse the direction of the airflow through the static bypass duct 18. The change from positive to reverse pitch may be made either through zero pitch or through the feathered position. In the reverse thrust mode of operation, the fan draws in air through the fan nozzle 63 whereupon some of the air passes into the primary compressor air inlet 26 with the remainder of the air passing back into the atmosphere through the fan inlet 15. In order to increase the reverse airflow inlet area to the fan during the reverse thrust mode of operation, the shroud 56 is translated by the actuator 80 to its extreme downstream position. As is readily apparent, the area of the fan nozzle 63 is thus maximized to admit a maximum reverse inlet airflow. Translating the shroud 56 rearwardly also operates to uncover the auxiliary inlet to the compressor whereupon a portion of the reverse thrust airflow enters the plenum 72 through the opening 74 and is thereafter turned in a gradual manner by the vanes 78 to enter the compressor 30. In this manner, an adequate flow of air is furnished to the compressor 30 even during the reverse thrust mode of operation when the airflow through the static bypass duct 18 is reversed.

In addition during takeoff and cruise, the combined nozzle and auxiliary inlet arrangement of this invention may be used to simultaneously vary the fan and core nozzle areas in a manner which reduces both noise and fuel comsumption.

Thus the invention herein described provides a means for maximizing the area of the fan nozzle 63 during the reverse thrust mode of operation while also providing means to insure an adequate flow of air to the inlet of the compressor from the fan nozzle 63 when the direction of airflow is reversed. It will be further appreciated that during the reverse thrust mode of operation the concave portion 69 of the shroud 56 is translated rearwardly so as to increase the effective exhaust nozzle area of the core engine 13 during reverse thrust mode of operation to spoil core engine thrust, thus adding to the overall efficiency of thrust reversal. Also, it will be appreciated that the outer fan cowling 20 does not require nozzle flaps or actuators, thus permitting a thinner cowling than heretofore possible.

Accordingly, while a preferred embodiment of the present invention has been depicted and described, it will be appreciated by those skilled in the art that many modifications, substitutions and changes may be made thereto without departing from the invention's fundamental theme. For example, the translating shroud 56 herein depicted could also be used to simultaneously vary the fan and core engine nozzle areas in a conventional fixed pitch type of fan engine with conventional reversers. Thus having described a preferred embodiment of the invention, though not exhaustive of all possible equivalents, what is desired to be secured by Letters Patent is distinctly claimed and particularly pointed out in the claims appearing below.

What is claimed is:

1. A gas turbine engine of the bypass type comprises:
   a core engine comprising a compressor, combustor and turbine in serial flow relation and a core exhaust nozzle;
   a bypass duct around the core engine with a bypass exhaust nozzle, and
   translating shroud means disposed intermediate the bypass duct and core engine for simultaneously varying the exit areas of the core and bypass exhaust nozzles.

2. A gas turbine engine of the bypass type comprises:
   a core engine comprising a compressor, combustor and turbine in serial flow relation and a core exhaust nozzle;
   a bypass duct around the core engine with a bypass exhaust nozzle;
   a variable pitch fan disposed within the bypass duct;
   an auxiliary inlet to the compressor of the core engine, and
   means for simultaneously varying the areas of the core and bypass exhaust nozzles while also uncovering the auxiliary inlet to the compressor of the core engine during the reverse thrust mode of operation.

3. A gas turbine engine of claim 2 wherein the exhaust nozzle varying means comprises a shroud translatably disposed around the core engine such that extreme upstream translation of the shroud operates to simultaneously open the exit areas of the core and bypass nozzles while downstream translation of the shroud to an intermediate position operates to simultaneously close the exit areas of the core and bypass nozzles and extreme downstream translation of the shroud operates to again simultaneously open the areas of the core and bypass nozzles while at the same time opening the auxiliary inlet to the core engine to accommodate reverse pitch operation of the fan.

4. The gas turbine engine of claim 3 wherein the shroud includes: an exterior surface which initially diverges to a throat and thereafter converges toward the aft end thereof and cooperates with outside spaced apart cowling to define the bypass nozzle; and an interior surface, the downstream end of which includes a converging portion, a throat portion and a diverging portion and the upstream end of which includes a circumferential concave portion such that the entire interior surface of the shroud cooperates with an interiorly spaced bulbous centerplug to define the core engine exhaust nozzle.

5. The gas turbine engine of claim 2 wherein the core engine includes an outer casing housing a compressor, combustor and turbine in serial flow relation and the auxiliary inlet is defined between the outer casing and an inner casing spaced apart therefrom to define an annular plenum therebetween and also including a first opening in the outer casing to the plenum as well as a second opening in the inner casing from the plenum wherein a portion of the reverse airflow can enter the plenum through the first opening and thereafter exit from the plenum through the second opening.

* * * * *